US010211998B2

(12) United States Patent
Silva

(10) Patent No.: US 10,211,998 B2
(45) Date of Patent: *Feb. 19, 2019

(54) ADDING DEVICES TO AN EXPANDABLE MULTIMEDIA CONTROL SYSTEM

(71) Applicant: Savant Systems, LLC, Hyannis, MA (US)

(72) Inventor: Michael C. Silva, East Sandwich, MA (US)

(73) Assignee: Savant Systems, LLC, Hyannis, MA (US)

( * ) Notice: Subject to any disclaimer, the term of this patent is extended or adjusted under 35 U.S.C. 154(b) by 64 days.

This patent is subject to a terminal disclaimer.

(21) Appl. No.: 14/613,008

(22) Filed: Feb. 3, 2015

(65) Prior Publication Data
US 2015/0156029 A1 Jun. 4, 2015

Related U.S. Application Data

(63) Continuation of application No. 12/682,335, filed as application No. PCT/US2008/010363 on Sep. 4, 2008, now Pat. No. 8,954,176.
(Continued)

(51) Int. Cl.
H04L 12/28 (2006.01)
H04L 12/24 (2006.01)
H04L 12/26 (2006.01)

(52) U.S. Cl.
CPC ........ *H04L 12/2809* (2013.01); *H04L 12/282* (2013.01); *H04L 41/0816* (2013.01);
(Continued)

(58) Field of Classification Search
CPC . H04L 12/2809; H04L 41/0816; H04L 43/10; H04L 12/282; H04L 2012/2849;
(Continued)

(56) References Cited

U.S. PATENT DOCUMENTS 7,561,179 B2  7/2009 Johansen et al.
8,291,049 B2 10/2012 Roos
(Continued)

FOREIGN PATENT DOCUMENTS

EP        1 355 451 A2   10/2003
WO   WO-01/08152 A1    2/2001
(Continued)

OTHER PUBLICATIONS

"Notification of Transmittal of the International Search Report and the Written Opinion of the International Searching Authority, or the Declaration," International Filing Date: Apr. 9, 2008, International Application No. PCT/US2008/0010363, Applicant: Savant Systems LLC, Inc., dated Jan. 20, 2009, pp. 1-13.
(Continued)

*Primary Examiner* — Pao Sinkantarakorn
*Assistant Examiner* — Kabir U Jahangir
(74) *Attorney, Agent, or Firm* — Cesari and McKenna, LLP; James A. Blanchette

(57) ABSTRACT

In one embodiment, device addition to an expandable multimedia control system is performed without creating or modifying source code. A configuration bundle is stored on a first device of the expandable multimedia control system, the configuration bundle including a list of unique identifiers (UIDs) representing devices that are eligible to become a part of the expandable multimedia control system. The first device monitors a local area network (LAN), and determines a UID of a second device. The first device compares the UID of the second device with the list of UIDs in the configuration bundle. In response to a match of the UID of the second device with a UID of the list of UIDs in the configuration bundle, the second device is added to the expandable multimedia control system, and at least a portion of the configuration bundle is shared with it.

20 Claims, 4 Drawing Sheets

Related U.S. Application Data

(60) Provisional application No. 60/970,176, filed on Sep. 5, 2007.

(52) U.S. Cl.
CPC .......... *H04L 43/10* (2013.01); *H04L 41/5035* (2013.01); *H04L 2012/2849* (2013.01)

(58) Field of Classification Search
CPC ............. H04L 41/5035; H04L 41/0809; H04L 12/2803–12/2838; H04L 41/0886; H04L 41/26; H04L 41/0803–41/0889
See application file for complete search history.

(56) References Cited

U.S. PATENT DOCUMENTS

| | | | | |
|---|---|---|---|---|
| 8,364,335 | B1* | 1/2013 | Preston | B60R 25/00 701/24 |
| 2003/0055959 | A1* | 3/2003 | Sato | H04L 41/24 709/224 |
| 2003/0122866 | A1 | 7/2003 | Yook | |
| 2004/0246041 | A1 | 12/2004 | Chung | |
| 2005/0060700 | A1 | 3/2005 | Bucher et al. | |
| 2005/0120246 | A1* | 6/2005 | Jang | H04L 12/2807 726/4 |
| 2005/0169219 | A1 | 8/2005 | Serpa et al. | |
| 2006/0150236 | A1* | 7/2006 | Sakuda | H04L 12/281 725/135 |
| 2006/0161960 | A1* | 7/2006 | Benoit | G08B 13/19656 725/105 |
| 2007/0068925 | A1 | 3/2007 | Ohara | |
| 2007/0113184 | A1 | 5/2007 | Haot et al. | |
| 2007/0142022 | A1* | 6/2007 | Madonna | H04N 7/163 455/352 |
| 2007/0143801 | A1* | 6/2007 | Madonna | H04L 12/2803 725/80 |
| 2007/0197160 | A1 | 8/2007 | Health et al. | |
| 2008/0043110 | A1 | 2/2008 | Aizawa | |
| 2008/0120429 | A1 | 5/2008 | Millington | |
| 2008/0127063 | A1 | 5/2008 | Silva | |
| 2008/0288284 | A1 | 11/2008 | Leichner et al. | |
| 2009/0059272 | A1* | 3/2009 | Matsushita | G06F 9/4411 358/1.15 |

FOREIGN PATENT DOCUMENTS

| | | |
|---|---|---|
| WO | WO-06/022432 A | 3/2006 |
| WO | WO-2006/055484 A1 | 5/2006 |

OTHER PUBLICATIONS

"Notification of Transmittal of the International Search Report and the Written Opinion of the International Searching Authority, or the Declaration," International Filing Date: Sep. 4, 2008, International Application No. PCT/US2008/010376, Applicant: Savant Systems LLC, Inc., dated Apr. 14, 2009, pp. 1-12.

U.S. Appl. No. 11/687,511, filed Mar. 16, 2007 by Robert P. Madonna entitled System and Method for Mixing Graphics With Video Images or Other Content, 31 pages.

U.S. Appl. No. 12/682,335, filed Sep. 4, 2008 by Michael C. Silva entitled Expandable Multimedia Control System and Method, pp. 1-23.

"Yamaha DME Designer: Owner's Manual," Version 2.0, Yamaha Corporation, Software and System: Copyright and available for sale 2004, pp. 1-482.

* cited by examiner

ADDING DEVICES TO AN EXPANDABLE MULTIMEDIA CONTROL SYSTEM

CROSS-REFERENCE TO RELATED APPLICATIONS

The present Application is a continuation of U.S. patent application Ser. No. 12/682,335, which was filed on Apr. 9, 2010 by Michael C. Silva for a MULTIMEDIA CONTROL SYSTEM AND METHOD, which is a national stage under 35 U.S.C. § 371 of PCT/US2008/010363, which was filed on Sep. 4, 2008, by Michael C. Silva for an EXPANDABLE MULTIMEDIA CONTROL SYSTEM AND METHOD, which claims the benefit of U.S. Provisional Patent Application Ser. No. 60/970,176, which was filed on Sep. 5, 2007, by Michael C. Silva for a MULTIMEDIA CONTROL SYSTEM AND METHOD, all of which are incorporated by reference herein.

FIELD OF THE INVENTION

The present invention relates generally to the fields of multimedia and communications and, more specifically, to an expandable multimedia control system for home, commercial, professional audio or video, broadcast or film studio, security, automation or other use.

BACKGROUND INFORMATION

Various multimedia control systems exist which may be used to interconnect and control a wide variety of audio, video and possibly other types of devices. Many conventional multimedia control systems require the creation or customization of at least some source code in order to initially configure a system as well as to account for subsequent changes in system components, system expansion and the like. Historically, dealers and installers, as opposed to manufacturers, were the ones confronted with the slow, costly and inconvenient task of customizing software, often through subcontract to independent software developers.

At least from the perspective of dealers and installers, there are several major disadvantages with the conventional approach. First, it is extremely difficult to control quality in connection with customized software. Dealers and installers are put in the position of relying upon independent developers to document and maintain complex systems on a per customer basis. If a customer's equipment is damaged or destroyed, it may be very time-consuming, costly or impossible to reconstruct and restore the customer's system. In addition, if something does not work, it is the dealer or installer who the customer knows and will look to for resolution.

Second, customized software may not support or may interfere with the operation of equipment that the customer wishes to add to his or her system in the future. In view of the cost and inconvenience, most customers will not be satisfied with a system which requires software customization simply to add new equipment, upgrade or expand system capacity. Such dissatisfaction negatively affects a dealer's or installer's business by reduced future sales of upgrades and new equipment.

SUMMARY

In brief summary, the present invention provides an expandable multimedia control system and method for expanding same. The expandable system includes a master programmable multimedia controller (PMC), which is based on a general purpose computer and is capable of providing a wide variety of programmable services. The master PMC is responsive to a system configuration. The system configuration associates a unique identifier with each subordinate PMC which is eligible to become part of an expanded system. Through its own configuration information, each subordinate PMC is aware of a unique identifier that was previously assigned to that PMC.

When advertising its availability to join an existing multimedia control system, a subordinate PMC will communicate with the master PMC. The master PMC, based upon the unique identifier that a subordinate PMC advertises, will determine whether the subordinate PMC is eligible to become part of an expanded system.

The present invention provides a number of advantages including a flexible, scalable architecture which enables future expansion without creating or modifying source code. In systems where multiple programmable multimedia controllers are present and arranged in multiple zones which correspond, for example, to different areas of a house, the present invention enables programmable services available in one zone to be controlled by a user interface located in a different zone. Similarly, the present invention enables components located in one zone to be used to provide programmable services in another zone and to support a zone of shared resources or components. The present invention enables scalability of control ports and localized control of components, which substantially reduces the need for long cable runs between dispersed components and a central point.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
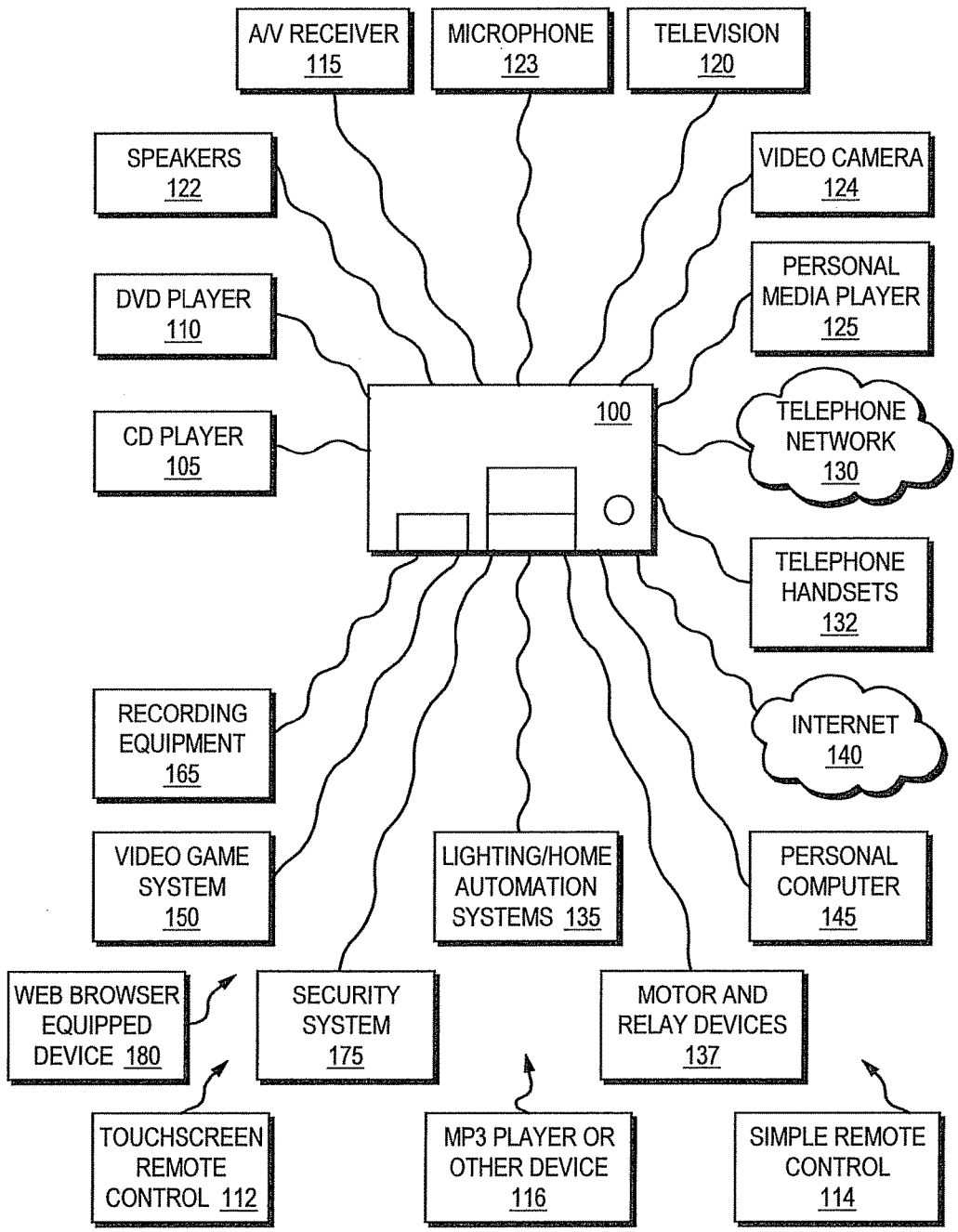
FIG. 1 is a block diagram of a programmable multimedia controller which is capable of interconnecting with and controlling a variety of devices.

FIG. 1 is a block diagram of a programmable multimedia controller 100 interconnected with a number of devices. The term "programmable multimedia controller" should be interpreted broadly as a device capable of controlling, switching data among, or interoperating with a variety of electronic devices, such as audio, video, telephony, data, security, motor-driven, relay-driven, or other types of electronic devices. By interacting with these devices the programmable multimedia controller may implement an integrated multimedia control solution.

In an illustrative embodiment, programmable multimedia controller 100 may be connected to a wide range of audio/video components, for example, a compact disk (CD) player 105, a digital versatile disc (DVD) player 110, an audio/ video receiver 115, a television 120, a personal media player 125, speakers 122, a microphone 123, and a video camera 124. Programmable multimedia controller 100 may also be connected to telephony devices such as a telephone network 130 and telephone handsets 132. Telephone network 130 may be a publicly switched telephone network (PSTN), an Integrated Services Digital Network (ISDN) or other public or private telecommunications network.

In addition, programmable multimedia controller 100 may intercommunicate with variety of light or home automation systems 135. Systems 135 may operate using the X10 protocol developed by Pico Electronics, the INSTEON™ protocol developed by SmartHome, Inc., the CEBus standard managed by the CEBus Industry Council, or another well known home automation or control protocol. Similarly programmable multimedia controller 100 may be connected to motor or relay operated devices 137 that may include, for example, a heating, ventilation and air conditioning system (HVAC) system, an irrigation system, an automatic shade or blind system, an electronic door lock, or other types of devices.

A computer network, such as the Internet 140, may also be connected to multimedia controller 100. In addition, a personal computer (PC) 145, video game systems 150, home recording equipment 165 or other devices may also be connected to multimedia controller 100.

A wide variety of devices may be used as remote controls which interface with and control the operation of multimedia controller 100 and, in turn, the operations of components or systems that may be interconnected with controller 100. Such remote controls may include a touchscreen remote control 112, a simple remote control 114, which may be electromechanical, an MP3 player or other device 116, and a web browser-equipped device 180.

Web browser-equipped device 180 includes a wireless telephone handset such as an Apple® iPhone®, an Internet tablet, a notebook, laptop or other computer, or essentially any other device which is browser-enabled and has appropriate connectivity, wireless or wired, to communicate with programmable multimedia controller 100.

Such remote controls may interface with multimedia controller 100 via a wired connection, an IR link, an RF link, a Bluetooth® link, a ZigBee® link or another appropriate communication interface.

Details regarding the hardware, software, capabilities and programmability of programmable multimedia controller 100 may be found in the co-pending related applications referenced above.

Figure 2:
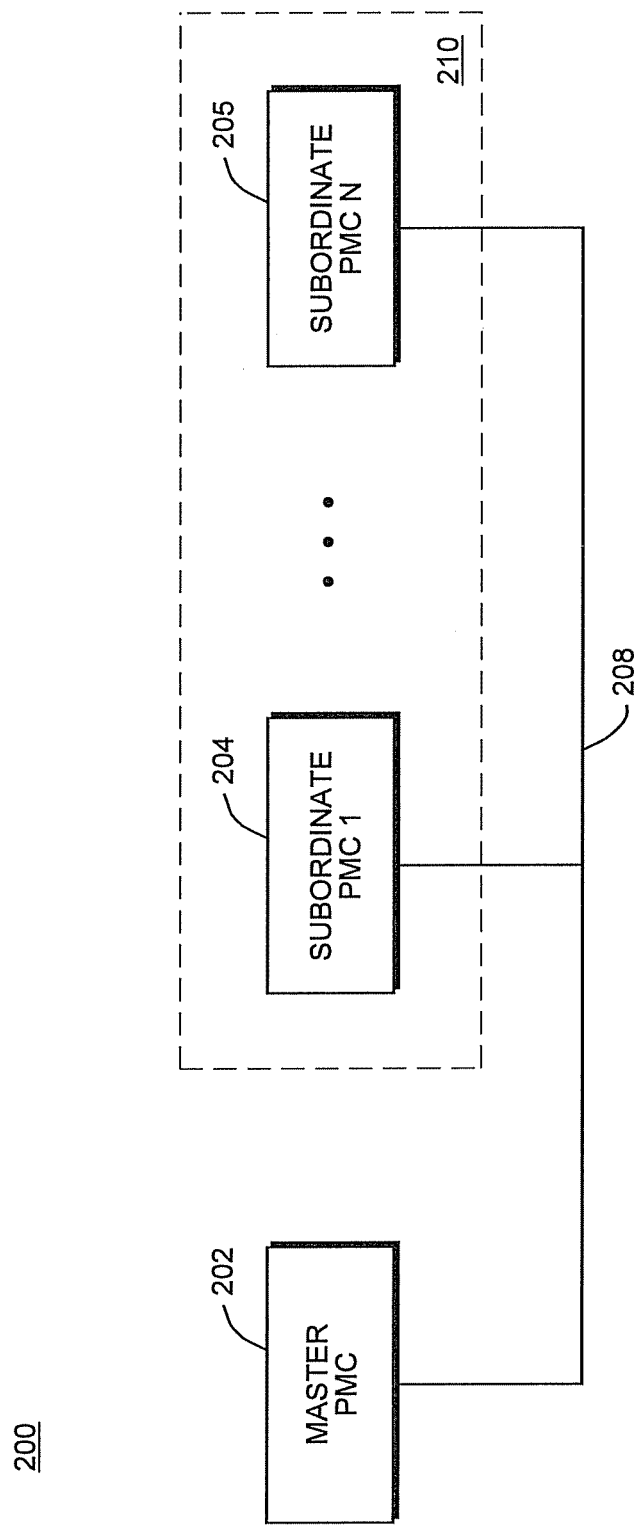
FIG. 2 is a block diagram of an expandable multimedia control system constructed in accordance with an embodiment of the present invention.

FIG. 2 shows an expandable multimedia control system 200. A master programmable multimedia controller (PMC) 202 is coupled in communicating relationship via a local area network (LAN) 208 with a first subordinate PMC 204 and optionally with one or more additional subordinate PMCs 205. For purposes of clarity, any components or devices that would normally be interconnected with any of PMCs 202-205, such as those shown in FIG. 1, are omitted.

It should be understood that, as an alternative to LAN 208, any of a number of other suitable communication links or technologies may be used including point-to-point, wired and wireless technologies.

In an illustrative embodiment, master PMC 202 includes some or all of the hardware and overall functionality as that of the programmable multimedia controller disclosed in the related, co-pending U.S. patent application Ser. No. 11/687,511, filed on Mar. 16, 2007 entitled "Systems and Method for Mixing Graphics With Video Images or Other Content", which is incorporated by reference herein.

Subordinate PMCs 204 and 205 may contain similar hardware and functionality as that of master PMC 202 or may contain only desired subsets of such hardware and functionality. In general, subordinate PMCs may be necessary or desirable in a particular installation for a variety of reasons including: to provide additional control ports (e.g., RS-232, RS-422, RS-485, IR, relay, GPIO or Ethernet) within the system as a whole; to provide additional audio processing or switching capacity; or to provide additional video processing or switching capacity. Thus, the choice of hardware and corresponding functionality to include in a particular subordinate PMC are often heavily influenced by the requirements of the particular installation.

As described in co-pending U.S. patent application Ser. No. 11/314,112, filed on Dec. 20, 2005, entitled "Programmable Multimedia Controller With Programmable Services" and U.S. patent application Ser. No. 11/520,215, filed on Sep. 13, 2006, entitled "Programming Environment and Metadata Management for Programmable Multimedia Controller," which are incorporated herein by reference, configuration of master PMC 202 may advantageously be done in a graphical programming environment. In general, as a result of the configuration process described in those co-pending applications, a set of files, referred to collectively as a "configuration bundle," representing a particular system configuration (i.e., a particular set of components or devices, arranged in particular zones, and interconnected in a particular way with master PMC 202) is created. In an embodiment, during the configuration process, a person such as a dealer or installer will specify whether a particular PMC is a master or subordinate. Such specification may be explicitly made, may occur implicitly according to where the PMC is placed in a system hierarchy or may be made otherwise.

Within the configuration bundle for master PMC 202 is information regarding any subordinate PMCs, such as subordinate PMCs 204 and 205, which are eligible to operate in conjunction with master PMC 202 as part of a possible future expansion 210 of system 200. Among other information, the configuration bundle for master PMC 202 contains a predetermined unique identifier (e.g., a number, name or value which may be considered unique within system 200) for each subordinate PMC 204 and 205 which master PMC 202 will recognize as an eligible PMC should it appear in the future.

Similar to master PMC 202, each subordinate PMC 204 and 205 receives its own configuration bundle. The configuration bundle for each of subordinate PMCs 204 and 205 includes the unique identifier (UID) for the associated subordinate PMC. Within the configuration bundle for all PMCs is information which tells the particular PMC using that bundle whether to identify itself and operate as a master or as a subordinate.

Figure 3:
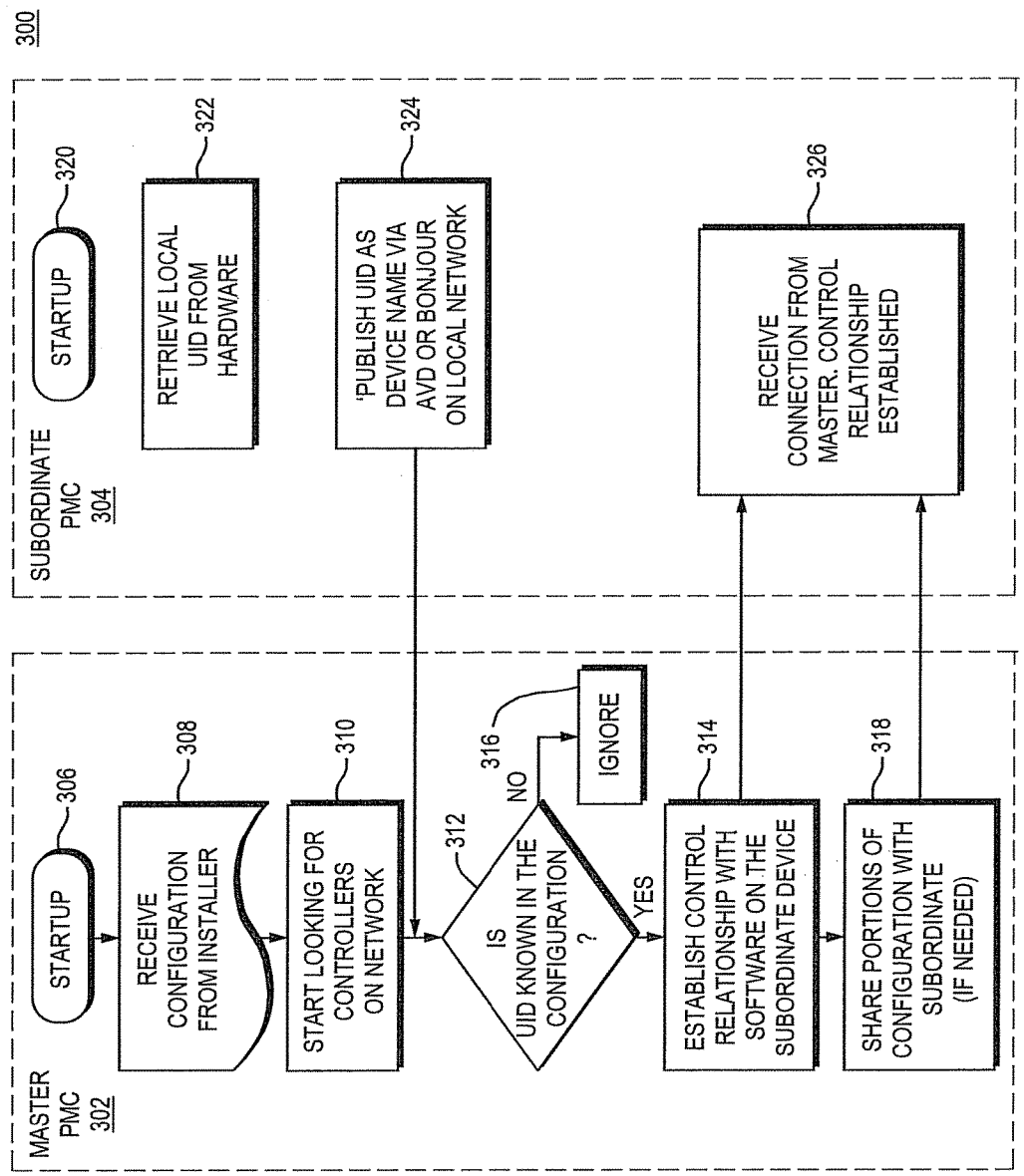
FIG. 3 is a flowchart showing a method for determining whether to add a subordinate programmable multimedia controller to an expandable multimedia control system.

FIG. 3 is a flowchart showing a method 300 for adding a subordinate PMC to an expandable multimedia control system. In method 300, processes, functions or events which are associated with a master PMC are denoted collectively by reference number 302. Similarly, processes, functions or events which are associated with subordinate PMC are denoted collectively by reference number 304.

Following any necessary preparatory actions during startup 306, a master PMC will receive its configuration bundle from an installer program at step 308. Subsequently, having determined from information in the configuration bundle that it is a master PMC, the master PMC at step 310 starts looking for other PMCs that may be present on a local network, such as LAN 208 (FIG. 2). In an embodiment, a master PMC may use Apple® Bonjour® service discovery protocol to advertise its search for other PMCs.

Meanwhile, a subordinate PMC that is connected to LAN 208 or otherwise provided with a communication link to the master PMC performs necessary preparatory actions during startup 320. From the time it was manufactured, subordinate PMC is aware of its own UID which may, for example, be a serial number stored in nonvolatile memory within the subordinate PMC. Thus, at step 322, subordinate PMC will retrieve its own UID. Next, at step 324, a subordinate PMC may "publish" its UID using either a system message (AVD), discussed below in connection with FIG. 4, or Apple® Bonjour® over LAN 208. Other wired or wireless communication protocols and technologies may be used as well.

A PMC which has not yet been configured will still preferably publish its UID. In the case of a PMC which is destined to become a master PMC, the published UID would typically be detected by a system monitor (not shown) running on a human installer's notebook or other computer. Thus, the prospective master PMC will typically receive its configuration bundle from a configuration management tool (not shown) running on the installer's computer.

In the case of a PMC which is destined to become a subordinate PMC, the published UID is essentially an indication that the subordinate PMC is available to join an existing system. As described below, assuming that the subordinate PMC is detected and recognized by a master PMC (or other supervisory entity such as a system monitor) as eligible to join the system, the master PMC will provide appropriate configuration information to the subordinate PMC.

The "published" UID 328, when received by a master PMC, is compared at step 312 to UIDs which are listed as valid in the master PMC's configuration bundle. If there is no match, then master PMC may simply ignore the published UID at step 316. An absence of a match may indicate several possible conditions including the subordinate PMC is not authentic or the PMC has an improper or out of date configuration.

Assuming that a match of UID is found at step 312, the master PMC proceeds at step 314 to establish a control relationship with the software on the subordinate PMC. Lastly, at step 318, if the master PMC determines that portions of its configuration bundle are needed by the subordinate PMC to operate properly, the master PMC shares a copy of such portions as needed.

Figure 4:
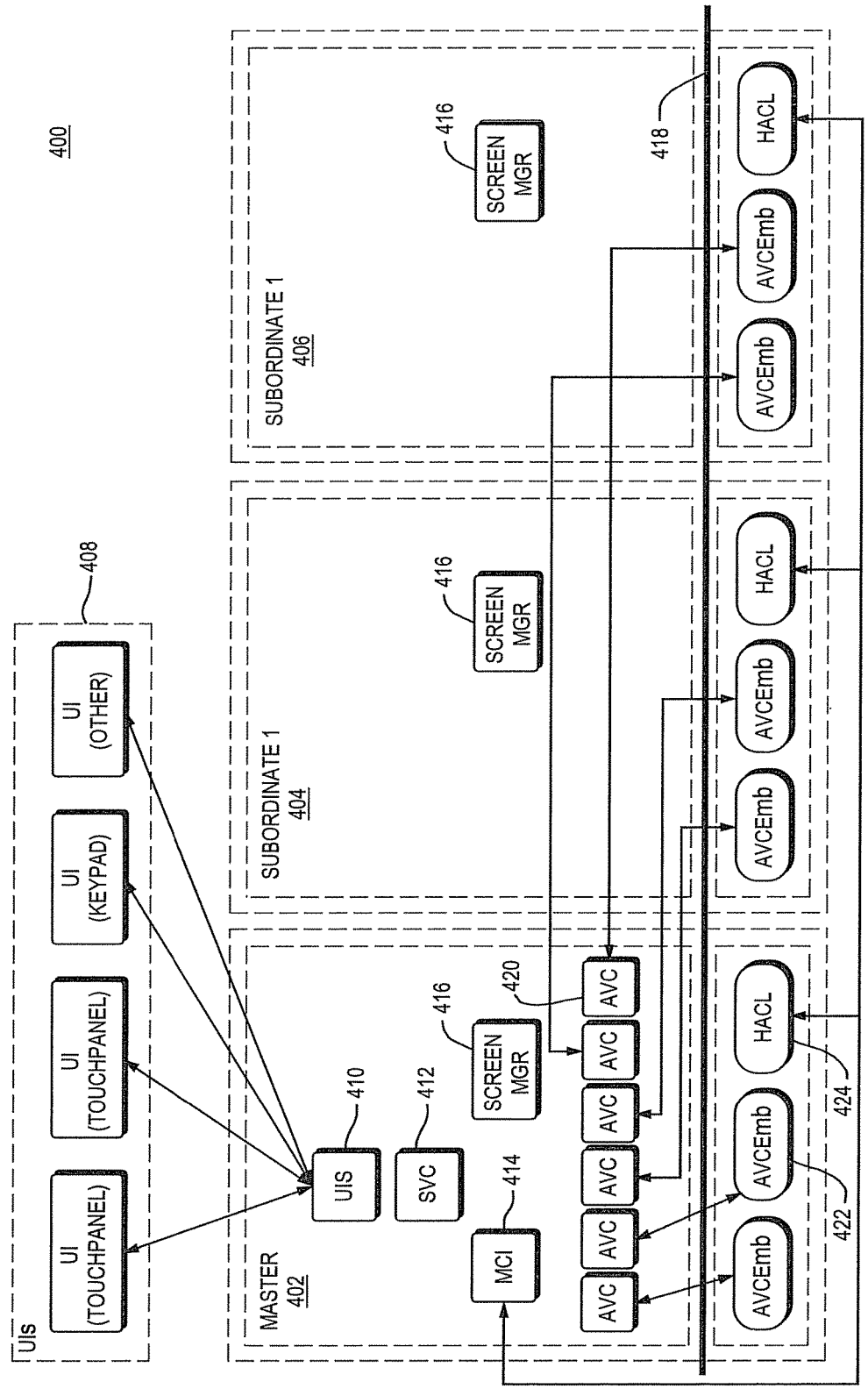
FIG. 4 is a block diagram showing particular higher level software processes which communicate among a master programmable multimedia controller and two subordinate programmable multimedia controllers.

FIG. 4 shows an embodiment in which particular higher level software processes communicate among a master programmable multimedia controller 402, two subordinate programmable multimedia controllers 404, 406 and user interfaces 408, all of which are part of an expanded control system 400. In an embodiment, such communications may be implemented with requests and responses that are based on the Simple Object Access Protocol (SOAP). Details regarding such software processes are described in related, co-pending application entitled "Programmable Multimedia Controller With Programmable Services" referenced above.

As shown, user interfaces 408 may include touchpanels, a keypad or other device which has appropriate functionality and connectivity to communicate with master PMC 402. Within master PMC 402, a user interface server (UIS) 410 is responsible for receiving commands or data (or both) transmitted by user interfaces 408 and responding appropriately. More specifically, UIS 410 maps a button press or other user interface action to a "service request" or message containing data on what the user wants to do (e.g., mute the television in a particular zone). UIS 410 also returns "state update" information to user interfaces 408 to effect appropriate realtime changes with respect to buttons, indicators and the like.

A Media Controller Interface (MCI), which is a piece of high-level software running on a general purpose computer that controls and coordinates the operations of the lower system layers for the purposes of media switch and processing is provided as MCI 414. MCI 414 operates in conjunction with a hardware abstraction control layer (HACL), which is a lower level piece of software running on the special purpose platform that takes the high level MCI commands and translates them to hardware-level requests (i.e. controls hardware).

HACLs 424, provides overall control of all audio and video processors and switches present within system 400. Screen managers 416 are processes that provide overall control of the screens displayed on touchpanels or other displays that may be interconnected with system 400.

In an embodiment, reference number 418 denotes a hierarchical boundary between those higher level processes, located above the boundary, which may run on the general purpose computer that is part of a master PMC, and those lower level software processes which may run on an embedded control processor. The system includes messaging between an Audio/Video Controller (AVC), which is a piece of high level software running on a general purpose computer that issues control commands to the devices that are being controlled by the PMC system and an Audio/Video Controller Embedded process (AVCEmb), which is a lower level piece of software running on the special purpose platform that relays control and acknowledgement messaging between the AVC and the device being controlled. In the illustrative embodiment, the messaging is done in this manner because control ports (RS232, IR, etc.) are located on special purpose hard ware.

More specifically, AVC process 420 and AVCEmb process 422 enable commands to be sent to and received from external devices (not shown) that may be connected to control ports. AVCEmb process 422 communicates directly with control ports located on the PMC in which that process is running. As shown, AVC processes 420 running in master PMC 402 communicate with AVCEmb processes 422 running in both master PMC 402 as well as subordinate PMCs 404 and 406. Through such communication, master PMC 402 is able to control a wide variety of external devices that may be connected to any control port in system 400.

The foregoing description has been directed to specific embodiments of this invention. It will be apparent, however, that other variations and modifications may be made to the described embodiments, with the attainment of some or all of their advantages. The procedures or processor may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A method for adding programmable multimedia controllers (PMCs) to an expandable multimedia control system, the method comprising:
   at a first time, initially configuring an expandable multimedia control system by storing a configuration bundle on a first PMC received from an installer, the configuration bundle including both a system configuration for operation of the first PMC and a list of predetermined unique identifiers (UIDs) representing additional PMCs that are eligible to become a part of the expandable multimedia control system as part of a future expansion; and at a subsequent time, expanding the expandable multimedia control system, by:
connecting a second PMC to a network used by the expandable multimedia control system;
publishing the UID of the second PMC on the network;
receiving, by the first PMC, the UID of the second PMC over the network;
comparing the UID of the PMC with the list of predetermined UIDs in the configuration bundle previously stored on the first PMC;
in response to a match of the UID of the second PMC with a UID of the list of predetermined UIDs in the configuration bundle previously stored on the first PMC, adding the second PMC to the expandable multimedia control system; and
sharing, by the first PMC, at least a portion of the configuration bundle with the second PMC to enable operation of the second PMC.

2. The method of claim 1, further comprising:
in response to the UID of the second PMC not matching any UID of the list of predetermined UIDs in the configuration bundle stored on the first PMC, ignoring the second PMC.

3. The method of claim 1, further comprising:
in response to the UID of the second PMC not matching any UID of the list of predetermined UIDs in the configuration bundle stored on the first PMC, assuming a particular condition exists.

4. The method of claim 1, further comprising:
in response to the match of the UID of the second PMC with the UID of the list of predetermined UIDs in the configuration bundle stored on the first PMC, establishing a control relationship between the first PMC and the second PMC.

5. The method of claim 1, wherein the first PMC and the second PMC are arranged in different zones of a plurality of zones that correspond to different areas of a house.

6. The method of claim 1, further comprising:
receiving the configuration bundle at the first PMC from a configuration management tool running on a separate device.

7. The method of claim 1, wherein the first PMC is a master PMC and the second PMC is a subordinate PMC.

8. The method of claim 7, wherein specification of the first PMC being master is indicated in the configuration bundle during initial configuration of the expandable multimedia control system.

9. The method of claim 1, wherein the system configuration includes information describing a plurality of components arranged in zones that correspond to different areas of a house, and the first PMC is arranged to control components in a first zone of the plurality of zones and the second PMC is arranged to control components in a second zone of the plurality of zones.

10. The method of claim 1, wherein the system configuration describes a plurality of components using a set of files, the set of files produced by a graphical programming environment during initial configuration of the expandable multimedia control system.

11. The method of claim 1, wherein the UID of the second PMC is a serial number retrieved from non-volatile memory of the second PMC.

12. The method of claim 1, wherein the receiving comprises:
monitoring the network using a service discovery protocol.

13. The method of claim 1, wherein the network is a wireless local area network (LAN).

14. An expandable multimedia control system comprising:
a configuration bundle including both a system configuration and a list of predetermined unique identifiers (UIDs) representing additional devices that are eligible to become a part of the expandable multimedia control system as part of a future expansion;
a first device that provides programmable services, the first device configured to store the configuration bundle at a first time during initial configuration of the expandable multimedia system; and
a second device that provides programmable services, the second device configured to be added to the expandable multimedia system at a second time to expand the system, the second device to join a network used by the expandable multimedia control system, retrieve a serial number from non-volatile memory, and publish the serial number as a UID of the second device over the network,
wherein the first device is further configured to receive the UID of the second device over the network, compare the UID of the second device with the list of predetermined UIDs in the configuration bundle previously stored on the first device, and in response to a match of the UID of the second device with a UID of the list of predetermined UIDs in the configuration bundle previously stored on the first device, add the second device to the expandable multimedia control system to expand the system.

15. The expandable multimedia control system of claim 14, wherein the first device is further configured to, in response to the match of the UID of the second device with the UID of the list of predetermined UIDs in the configuration bundle previously stored on the first device, share at least a portion of the configuration bundle with the second device to enable operation of the second device.

16. The expandable multimedia control system of claim 14, wherein the first device is further configured to, in response to the UID of the second device not matching any UID of the list of predetermined UIDs in the configuration bundle previously stored on the first device, ignore the second device.

17. The expandable multimedia control system of claim 14, wherein the first device and the second device are arranged in different zones of a plurality of zones that correspond to different areas of a house.

18. The expandable multimedia control system of claim 14, wherein the first device is a master programmable multimedia controller (PMC) and the second device is a subordinate PMC.

19. The expandable multimedia control system of claim 14, wherein the first device is a first programmable multimedia controller (PMC) and the second device is a second PMC, the system configuration includes information describing a plurality of components arranged in zones that correspond to different areas of a house, and the first PMC is arranged to control components in a first zone of the plurality of zones and the second PMC is arranged to control components in a second zone of the plurality of zones.

20. A non-transitory device-readable medium storing program instructions that when executed on one or more devices are operable to:
- at a first time, initially configure an expandable multimedia control system to include a first device by storing a configuration bundle received from an installer, the configuration bundle including both a system configuration and a list of predetermined unique identifiers (UIDs) representing additional devices that are eligible to become a part of the expandable multimedia control system as part of a future expansion; and
- at a subsequent time, expand the expandable multimedia control system by:
  - monitoring a network used by the expandable multimedia control system for the addition of the one or more new devices of the expandable multimedia control system;
  - upon receipt of a UID of a new device over the network, comparing the UID of the new device with the list of predetermined UIDs maintained in the configuration bundle;
  - in response to a match of the UID of the new device with a UID of the list of UIDs in the configuration bundle, adding the new device to the expandable multimedia control system; and
  - sharing at least a portion of the configuration bundle with the new device.

* * * * *